United States Patent
Dubowsky et al.

(10) Patent No.: US 9,016,877 B2
(45) Date of Patent: Apr. 28, 2015

(54) SYSTEM FOR DISCRETELY ACTUATED SOLAR MIRRORS

(75) Inventors: Steven Dubowsky, Boston, MA (US);
Amy M. Bilton, Cambridge, MA (US);
Seung J. Lee, Morrison, CO (US)

(73) Assignee: Massachusetts Institute of Technology, Cambridge, MA (US)

( * ) Notice: Subject to any disclaimer, the term of this patent is extended or adjusted under 35 U.S.C. 154(b) by 214 days.

(21) Appl. No.: 12/839,479

(22) Filed: Jul. 20, 2010

(65) Prior Publication Data
US 2012/0019941 A1 Jan. 26, 2012

(51) Int. Cl.
| G02B 5/08 | (2006.01) |
| G02B 7/182 | (2006.01) |
| F24J 2/08 | (2006.01) |
| G02B 26/08 | (2006.01) |
| G02B 7/183 | (2006.01) |
| F24J 2/10 | (2006.01) |

(52) U.S. Cl.
CPC ............ *G02B 26/0825* (2013.01); *G02B 7/183* (2013.01); *F24J 2002/1004* (2013.01); *F24J 2002/1085* (2013.01)

(58) Field of Classification Search
USPC ........................................................ 359/849
See application file for complete search history.

(56) References Cited

U.S. PATENT DOCUMENTS

| 4,944,580 | A | 7/1990 | MacDonald et al. |
| 5,109,349 | A | 4/1992 | Ulich et al. |
| 6,840,638 | B2 * | 1/2005 | Watson .......................... 359/849 |
| 6,842,277 | B2 * | 1/2005 | Watson .......................... 359/291 |
| 6,959,993 | B2 * | 11/2005 | Gross et al. .................... 359/853 |
| 7,064,885 | B1 | 6/2006 | Winzer |
| 7,125,128 | B2 | 10/2006 | Novak |
| 7,374,302 | B2 | 5/2008 | Griffith et al. |
| 7,411,331 | B2 | 8/2008 | Dubowsky et al. |
| 7,518,780 | B2 | 4/2009 | Papavasiliou et al. |
| 2004/0085657 | A1 | 5/2004 | Gullapalli et al. |
| 2005/0229924 | A1 * | 10/2005 | Luconi et al. ................. 126/696 |
| 2009/0084934 | A1 | 4/2009 | Pinto |
| 2010/0202071 | A1 * | 8/2010 | Preumont et al. ............. 359/849 |

FOREIGN PATENT DOCUMENTS

| WO | 00/34124 | 6/2000 |
| WO | 02/068319 A2 | 9/2002 |

OTHER PUBLICATIONS

A. Wingert et al., "On the Design of Large Degree-of-Freedom Digital Mechatronic Devices Based on Bistable Dielectric Elastomer Actuators", IEEE/ASME Transactions on Mechatronics, vol. 11, No. 4, Aug. 1, 2006, pp. 448-456.

(Continued)

*Primary Examiner* — Jade R Chwasz
(74) *Attorney, Agent, or Firm* — Sam Pasternack; MIT Technology Licensing Office

(57) ABSTRACT

System for establishing a surface shape. The system includes a compliant substrate including the surface and having a reverse side, and a plurality of discrete actuators engaging the reverse side and arranged in a selected pattern to control the surface shape as individual discrete activators are activated. It is preferred that the actuators have multiple discrete stable states of elongation. A particularly preferred embodiment uses actuators that are binary with two stable states of elongation.

12 Claims, 5 Drawing Sheets

(56) References Cited

OTHER PUBLICATIONS

Seung J. Lee et al, "On the Kinematics of Solar Mirrors using Massively Parallel Binary Actuation", Proceedings of the ASME 2010 International Design Engineering Technical Conferences & Computers and Information in Engineering Conference, Aug. 18, 2010.

The International Search Report and Written Opinion issued in connection with International Patent Application No. PCT/2011/041048 mailed on Oct. 6, 2011.

Gardner, J. P. et al. 2006, "The James Webb Space Telescope." Space Science Reviews, 123(4), pp. 486-606.

Mancni, T. et al., 2003, "Dish-String Sysems: An Overview of Development and Status" ASME J. of Solar Energy Eng., 125(5), pp. 135-151.

Coventry, J. S., 2005, "Performance of a Concentrating Photovoltaic/Thermal Solar Collector," Solar Energy, 78, pp. 211-222.

Lüpert, E. et al., 2001, "Eurotrough Design Issues and Protoype Testing at PSA," Proc. of Solar Forum 2001: Solar Energy: The Power to Choose, Washingon D.C.

Lee, Seung J., "Planar Feasibility study for Primary Mirror Control of Large imaging Space Systems using Binary Actuators," Master's Thesis, Department of Aeronautics and Astronautics, Massachusetts Institute of Technology, Mar. 2010.

\* cited by examiner

Structural Members with Embedded Discrete Actuators

SYSTEM FOR DISCRETELY ACTUATED SOLAR MIRRORS

BACKGROUND OF THE INVENTION

This invention relates to a system for establishing the shape of mirrors for solar collectors, and more particularly to such a system that uses discrete actuators.

Very large mirrors and optical arrays are used in a number of applications. These applications include in-orbit large space telescopes for astronomical imaging and scientific earth observation systems. Large mirrors and optical arrays may be used in terrestrial systems as well, such as large and small solar energy concentrators. These systems often consist of precision manufactured segmented mirrors and panels as seen in FIG. 1. Constructing these systems from a single mirror is not practical because of their large size.

One example of an in-orbit telescope is the James Webb Telescope now being designed and built by NASA [1]. Numerals in brackets refer to the references included herewith. The contents of all of the references cited herein are incorporated herein by reference in their entirety. Segmented mirror telescopes such as the James Webb Telescope often have errors in their composite shape due to construction tolerances in the mirror supporting structure and disturbances such as thermal distortions, gravity, etc. Mirrors in large telescopes like the James Webb apparatus are equipped with complex continuous actuators to correct their shape.

An important terrestrial example is solar concentration systems such as those seen in FIG. 1. Manufacturing precision mirrors for solar concentrators and making them robust to disturbances such as wind and thermal warping is expensive. Imprecision in mirror shape due to manufacturing limitations and disturbances degrades the performance of solar concentrator systems [2-4]. Embedding simple actuators in the mirror structure to correct the shape can decrease manufacturing costs and improve system performance.

Using embedded actuators to actively control a structure's shape is complex and has been a topic of research. Researchers have designed systems and protocols to align segmented mirror arrays. In one example developed by MacDonald et al., the segmented array of small square mirrors is aligned using continuous, linear piezoelectric actuators [5]. In a second example, Ulich et al. developed a shape correction system for a hexagonal segmented mirrors array [6]. In this implementation, each mirror segment is adjusted by three continuous piston actuators.

Researchers have also designed deformable mirror systems with embedded continuous actuators to correct the mirror shape. One approach that has been applied to control mirror shape is to laminate continuous actuators to the rear of the deformable mirror [7,8]. Types of actuators that have been considered include MEMS and piezoelectric devices. Another approach that has been considered is mounting continuous actuators in a flexible mirror-supporting structure. Novak considered using continuous linear actuators directly connected to a flexible mirror under force control [9]. Gullapalli et al. developed a technique which used continuous actuators embedded in a hinged truss substructure to adjust the shape of a deformable mirror [10]. Other researchers such as Griffith et al. used a combination of continuous actuators embedded in the mirror and in the mirror substructure [11].

These prior art solutions have several drawbacks. First, systems containing continuous actuators are complex and require a large number of actuators, sensors and motion control systems. For example, an n segment system would require 7n active motion control subsystems to control the position, orientation and shape of each element. Further, these continuous actuators are heavy, a major issue for space systems. In addition, these systems have a high probability of failure. The hostile environments in which solar mirrors are used (space, deserts and seaside regions) degrade precision motion control elements and repairs are often difficult or impossible due to restricted access.

It is an object of the present invention to provide a simpler system for controlling the shape and position of solar mirrors. Yet a further object is a system for controlling the shape and position of solar mirrors having a precision approaching that of conventional continuously actuated systems.

SUMMARY OF THE INVENTION

In a first aspect, the system of the invention for establishing a surface shape includes a compliant substrate including the surface and having a reverse side. A plurality of discrete actuators are provided to engage the reverse side of the substrate, and arranged in a selected pattern to control the surface shape as individual discrete actuators are activated. In a preferred embodiment, the actuators have multiple discrete stable states of elongation. A particularly preferred embodiment utilizes actuators that are binary thus having two stable states of elongation.

In a preferred embodiment of this aspect of the invention, the discrete binary actuators are dielectric elastic actuators. Other actuators may also be used. Such actuators include lead screws, pneumatic or hydraulic cylinders, or electromagnetic solenoids.

In this embodiment, the compliant substrate may include elastic elements or hinges. The substrate surface may include a mirror that may include multiple segments. The mirror may be part of a solar collector system. The surface may also include a photovoltaic collector panel or a thermal solar concentrator.

In another aspect, the invention is a system for establishing a mirror shape including a compliant substrate including a mirror and having a reverse side along with a plurality of discrete binary actuators engaging the reverse side and arranged in a selected pattern to control the mirror shape as the discrete binary actuators are activated.

The invention disclosed herein provides a simpler method of controlling the shape and position of solar mirrors. In an embodiment of this approach, binary actuators are embedded in a compliant mirror substructure, and the actuators are deployed in a specified pattern to correct mirror shape.

DESCRIPTION OF THE PREFERRED EMBODIMENT

Throughout the specification, whenever the term "mirror" is used it is noted that other elements such as photovoltaic collectors or thermal solar concentrator elements are intended as well.

Figure 1:
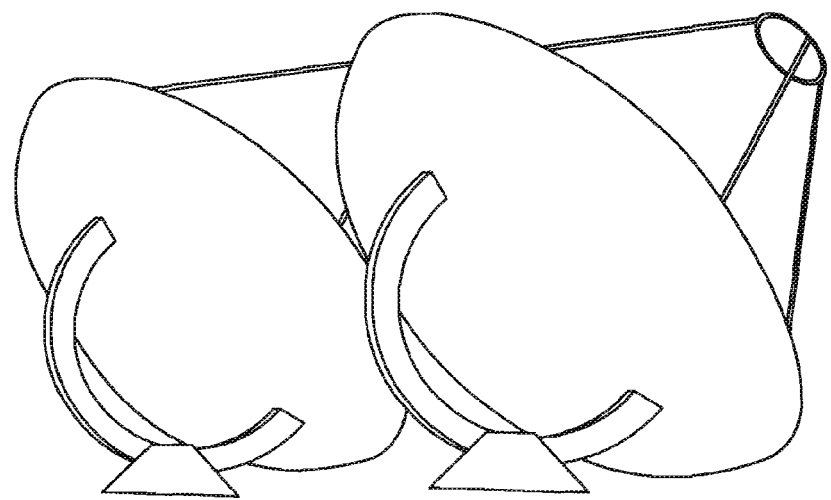
FIG. 1 is a photograph of parabolic dish solar collectors having a plurality of mirror segments.
Figure 2:
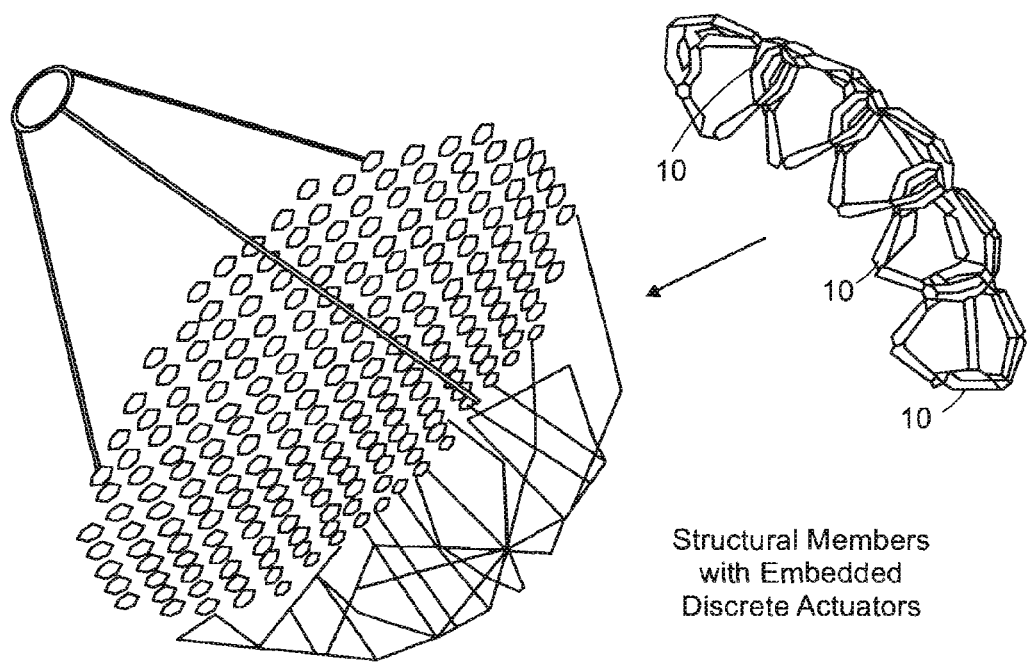
FIG. 2 is a schematic illustration of a primary mirror in an image forming instrument or solar collector with discretely actuated segments.

A mirror is usually mounted on a supporting structure that might contain hinges and elastic elements. Also contained in or mounted to the structure are actuators that can assume a multiplicity of stable positions of elongation. Power is not necessary to maintain each actuator in its stable positions. In a preferred embodiment these actuators are binary, but multi-stable configurations with larger numbers of states are also contemplated. One implementation of an embodiment of the invention is shown in FIG. 2. The discrete actuators 10 may be based on simple binary dielectric elastic actuators [12], lead screws, pneumatic or hydraulic cylinders, electromagnetic solenoids or other devices.

In one of the implementations of the invention, the binary actuators 10 may be mounted to mechanisms with relatively rigid elements. In this case, the mechanisms become a discrete positioning system. One instance is a tracking structure in which a base drive has a number of discrete stable positions so that the system is able to track a target, such as the sun, in a finite number of small steps.

Figure 3:
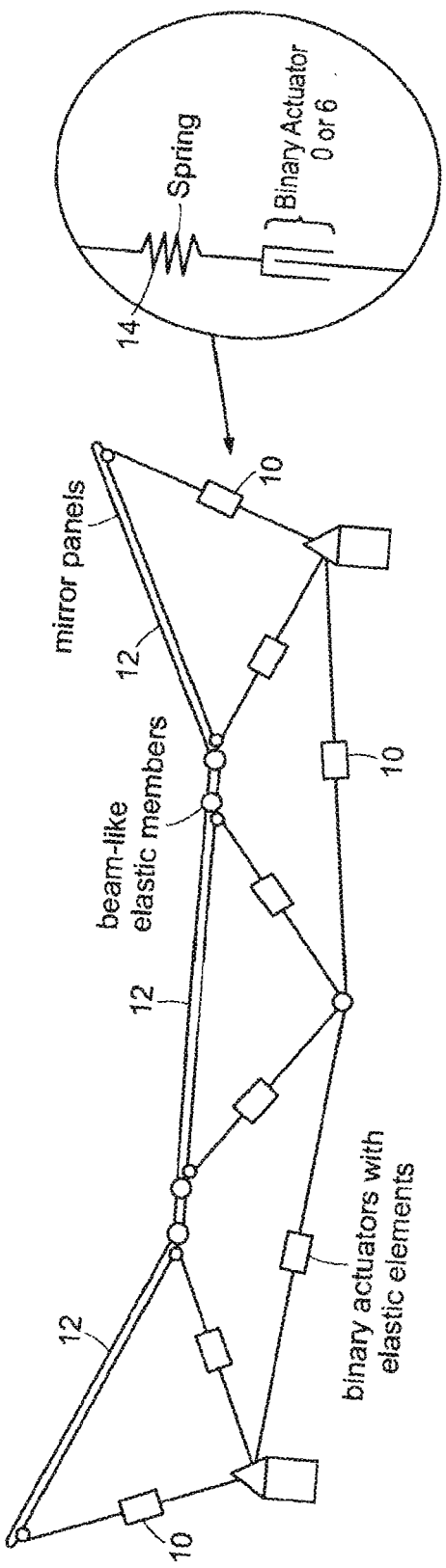
FIG. 3 is a schematic illustration of an embodiment of the invention using elastic elements.

In another application the bi-stable actuators 10 might be attached to a large structure with members having some significant elasticity. In this case, very simple actuators can apply known displacements or rotations to various points on the structure depending on whether linear or rotational actuators are used, respectively. The structure would then naturally deform, based on its design, to mediate the imposed displacements. The structural members must be of sufficient compliance so that the actuators can apply enough force to switch their state and result in motions large enough to compensate for any undesired distortions. An example system comprising segmented mirrors 12, binary actuators 10, and elastic elements 14 is shown in FIG. 3.

Assuming small actuator displacements, compared to the size of the structure to which the actuator is attached, the output displacements of the mirror segments can be calculated easily in the form of a linear matrix equation given by $y=Ad$ wherein y is a vector of structure displacements and d is a vector of ones and zeros defining which actuators are extended (1), and which actuators are contracted (0). This formulation can be used to determine which actuators need to be "switched" between their discrete positions to achieve a given structure shape. Ideally, the shape would compensate for errors in the structure due to manufacturing imperfections and disturbances described earlier. Also, limited-tracking motions can be achieved by this means to supplement the tracking function discussed above.

The approach of using discrete actuators according to the invention has many advantages. Binary actuators are simple, inexpensive and lightweight. Binary actuated systems are also robust due to their redundancy. Failure of individual binary actuators would result in a graceful degradation of performance. In addition, since the actuator output is discrete, low-level actuator sensors are not necessary, and computations for figure control can be performed offline. The control for the actuators themselves is very simple compared to conventional systems that require proportional control amplifiers. In contrast, with the present invention, in order to toggle the position, one would need only to switch the polarity of the signal to the actuators. Further, binary actuators are energy efficient as power is required only to change their states. In this way, very reliable, simple, low cost mirror correction systems are developed.

Figure 4:
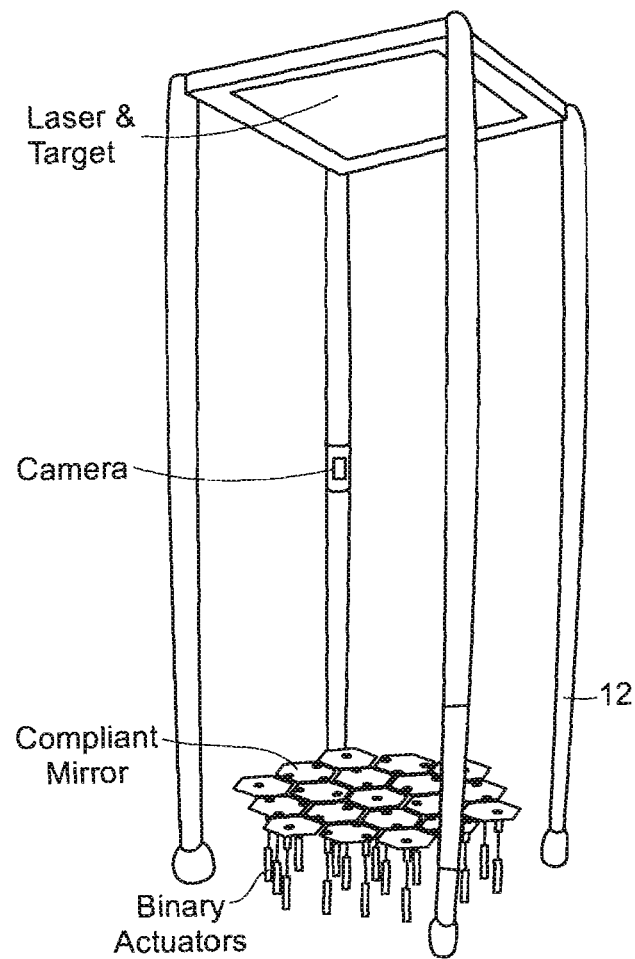
FIG. 4 is a photograph of an experimental system to demonstrate an embodiment of the invention.
Figure 5:
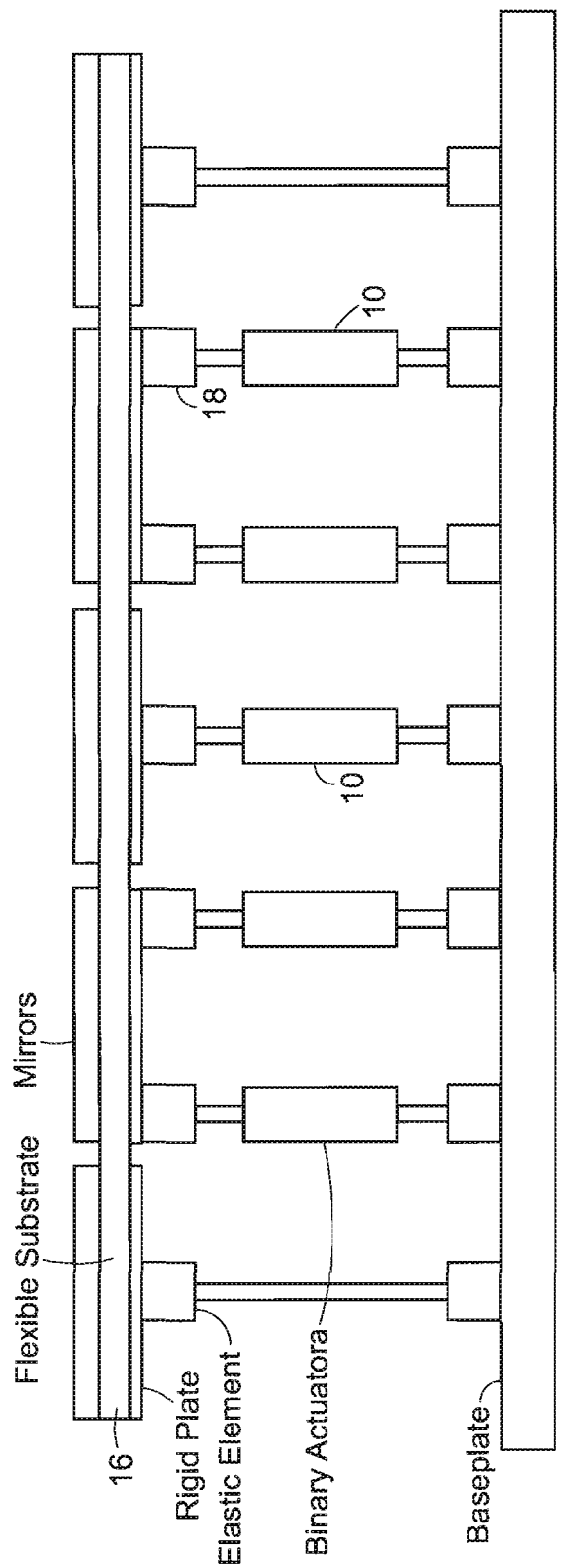
FIG. 5 is a cross-sectional view of a demonstration system according to an embodiment of the invention.
Figure 6:
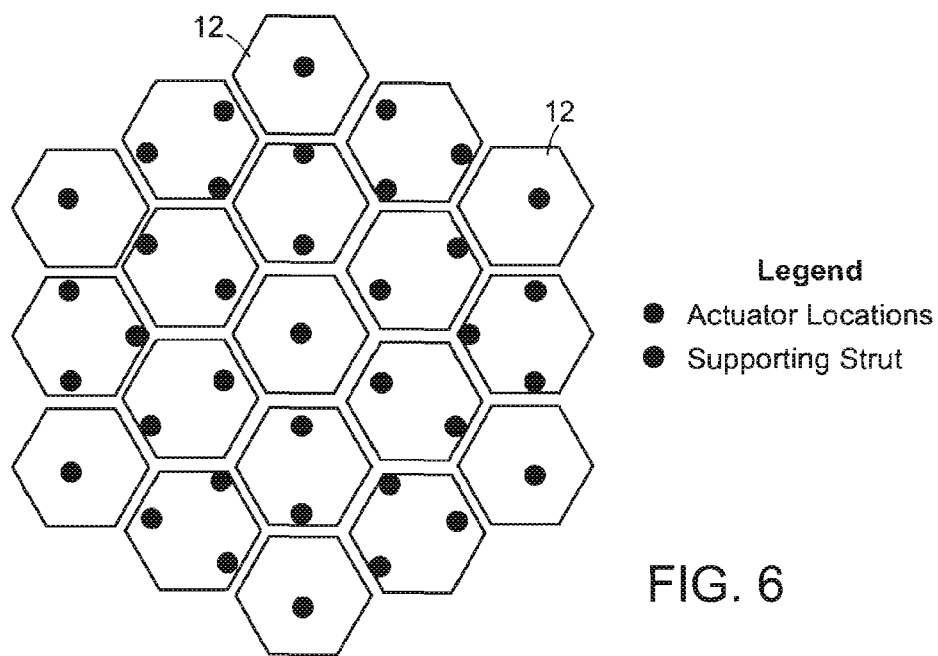
FIG. 6 is a schematic illustration showing the actuator layout for a demonstration system.

The mirror shape control technology system disclosed herein has been implemented in a small experimental system as shown in FIG. 4. In this implementation, the binary actuated mirror 12 comprises 19 hexagonal mirror panels mounted on a compliant plate. A cross section of the experimental system is shown in FIG. 5. A rigid plate 16 is supported by 13 vertical actuators 10, and 30 vertical compliant struts 18, as shown in FIG. 6. Because of force output limitations of current dielectric elastic actuators, micro-linear actuators were used in a binary fashion in the experiments conducted by the inventors.

In this demonstration system, the range and rotational workspace of the center mirror has been evaluated. In order to measure the workspace in an automated fashion, a vision-based measurement system was implemented. In this system, a laser beam is reflected off a center mirror onto a focal plane. A CCD camera captures images of the reflected ray in the focal plane. These images are processed to determine the position of the reflected ray and the angular deflection of the center mirror.

Figure 7:
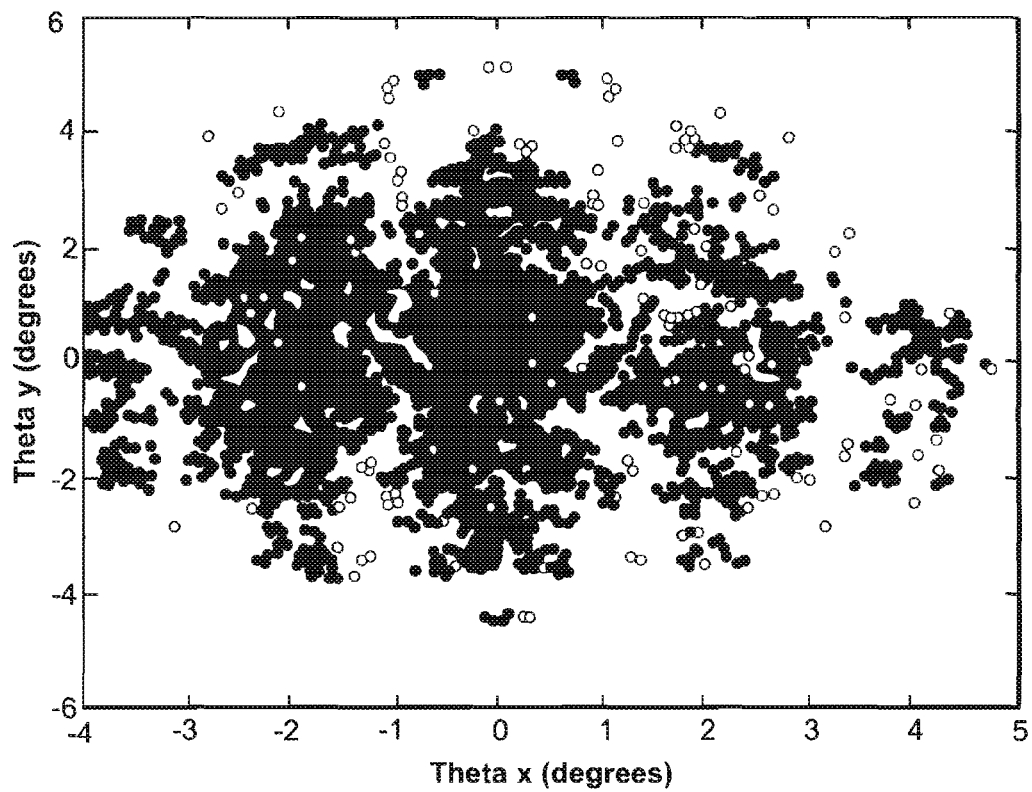
FIG. 7 is a graph showing the demonstration system center mirror workspace.

The workspace of the center mirror was queried for different actuator configurations. With 13 actuators, the system has 8192 ($2^{13}$) different configurations. Using varying stiffness elastic elements distributed throughout the system the workspace of the center mirror is evenly distributed. An example workspace is shown in FIG. 7. Through proper design of the supporting structure the mirror workspace can be distributed as desired.

The kinematics of the surface control system of the invention and other details may be found in [13, 14].

It is recognized that modifications and variations of the present invention will be apparent to those of ordinary skill in the art, and it is intended that all such modifications and variations be included within the scope of the appended claims.

REFERENCES

1. Gardner, J. P., Mather, J. C., Clampin, M., Doyon, R., Greenhouse, M. A., Hammel, H. B., Hutchings, J. B., Jakobsen, P., Lilly, S. J., Long, K. S., Lunine, J. I., McCaughrean, M. J., Mountain, M., Nella, J., Rieke, G. H., Rieke, M. J., Rix, H., Smith, E. P., Sonneborn, G., Stiavelli, M., Stockman, H. S., Windhorst, R. A., and Wright, G. S., 2006, "The James Webb Space Telescope." Space Science Reviews, 123(4), pp. 485-606.
2. Mancini, T., Heller, P., Butler, B., Osborn, B., Schiel, W., Goldberg, V., Buck, R., Diver, R., Andraka, C., and Moreno, J., 2003, "Dish-Stirling Systems: An Overview of Development and Status," ASME J. of Solar Energy Eng., 125(5), pp. 135-151.
3. Coventry, J. S., 2005, "Performance of a Concentrating Photovoltaic/Thermal Solar Collector," Solar Energy, 78, pp. 211-222.
4. Lüpfert, E., Geyer, M., Schiel, W., Esteban, A., Osuna, R., Zarza, E., and Nava, P., 2001, "Eurotrough Design Issues and Prototype Testing at PSA," *Proc. Of Solar Forum 2001: Solar Energy: The Power to Choose*, Washington, D.C.
5. MacDonald, Bruce G., Hulburd, William G., LaBelle, Raymond A., "Active segmented mirror including a plurality of piezoelectric drivers," U.S. Pat. No. 4,944,580, Jul. 31, 1990.
6. Ulich, Bobby L., Pflibsen, Kent, "Actively controlled segmented mirror," U.S. Pat. No. 5,109,349, Apr. 28, 1992.

7. Papavasiliou, Alexandros P., Olivier; Scot S., "Nanolaminate deformable mirrors" U.S. Pat. No. 7,518,780, Apr. 14, 2009.
8. Winzer, Stephen Randolph, "Composite ultra-light weight active mirror for space applications," U.S. Pat. No. 7,064,885, Jun. 20, 2006.
9. Novak, W. Thomas, "Adaptive-optics actuator arrays and methods for using such arrays," U.S. Pat. No. 7,125,128, Oct. 24, 2006.
10. Gullapalli, Sarma, Crane, Carl, White, Neil, Lipkin, Harvey, Duffy, Joseph, Duffy, Anne, "Hinged substrate for large-aperture, lightweight, deformable mirrors," United States Patent Application 20040085657, May 6, 2004.
11. Griffith; Michael S., Archer; Nicholas J., Laycock; Leslie C., "Deformable mirror," U.S. Pat. No. 7,374,302, May 20, 2008.
12. Dubowsky, Steven, Hafez, Moustapha, Weiss, Peter, Wingert, Andreas "Dielectic Elastomer Actuated Systems and Methods," U.S. Pat. No. 7,411,331, Aug. 12, 2008.
13. Lee, Seung J. et al., "On the Kinematics of Solar mirrors using Massively Parallel Binary Actuation," Proceedings of the ASME 2010 International Design Engineering Technical Conferences & Computers and Information in Engineering Conference, IDETC/CIE 2010, Aug. 15-18, 2010, Montreal, Quebec, Canada.
14. Lee, Seung Jae, "Planar Feasibility Study for Primary Mirror Control of Large Imaging Space Systems Using Binary Actuators," Master's Thesis, Department of Aeronautics and Astronautics, Massachusetts Institute of Technology, March, 2010.

What is claimed is:

1. System for establishing a surface shape comprising:
    a compliant continuous substrate including the surface and having a reverse side, the substrate including a plurality of elastic elements; and
    a plurality of discrete actuators that and retract only in predetermined fixed steps engaging the reverse side and arranged in a selected pattern to control the surface shape as individual discrete actuators are activated, whereby activation of an individual discrete actuator affects surface shape locally and globally.

2. The system of claim 1 wherein the actuators have multiple discrete stable states of elongation.

3. The system of claim 2 wherein the actuators are binary with two stable states of elongation.

4. The system of claim 3 wherein the discrete binary actuators are dielectric elastic actuators.

5. The system of claim 1 wherein the actuators include lead screws, pneumatic or hydraulic cylinders or electromagnetic solenoids.

6. The system of claim 1 wherein the compliant substrate includes hinges.

7. The system of claim 1 wherein the surface includes a mirror.

8. The system of claim 7 wherein the mirror may include multiple segments.

9. The system of claim 7 wherein the mirror is part of a solar collector system.

10. The system of claim 1 wherein the surface includes a photovoltaic collector panel.

11. The system of claim 1 wherein the surface includes a thermal solar concentrator.

12. System for establishing a mirror shape comprising:
    a compliant substrate including a mirror and having a reverse side; the compliant continuous substrate including a plurality of elastic elements; and
    a plurality of discrete binary actuators that extend and retract only in predetermined fixed steps engaging the reverse side and arranged in a selected pattern to control the mirror shape as the discrete binary actuators are activated, whereby activation of an individual discrete actuator affects surface shape locally and globally.

* * * * *